(12) United States Patent
Mitchell

(10) Patent No.: US 6,920,655 B2
(45) Date of Patent: Jul. 26, 2005

(54) MULTI-PURPOSE MAT

(76) Inventor: James A. Mitchell, 1849 Jewett Dr., Los Angeles, CA (US) 90046

( * ) Notice: Subject to any disclaimer, the term of this patent is extended or adjusted under 35 U.S.C. 154(b) by 0 days.

(21) Appl. No.: 10/698,698

(22) Filed: Oct. 30, 2003

(65) Prior Publication Data

US 2004/0088789 A1 May 13, 2004

Related U.S. Application Data

(60) Provisional application No. 60/422,968, filed on Nov. 1, 2002.

(51) Int. Cl.[7] .................................................. B68G 5/00
(52) U.S. Cl. ..................................... 5/417; 5/425; 5/655
(58) Field of Search ............................ 5/417, 419, 420, 5/425, 655; 135/126, 128; 160/127, 135

(56) References Cited

U.S. PATENT DOCUMENTS

| | | |
|---|---|---|
| 4,137,584 A | 2/1979 | Sharber |
| 4,709,430 A | 12/1987 | Nicoll |
| 4,726,084 A | 2/1988 | Keserovich et al. |
| 4,860,777 A | 8/1989 | Orlando |
| 4,999,866 A | 3/1991 | Lindsey |
| 5,236,753 A | 8/1993 | Gaggero et al. |
| 5,473,785 A * | 12/1995 | Lager et al. .................... 5/655 |
| 5,711,336 A | 1/1998 | Nirmel |
| 6,114,002 A | 9/2000 | Rinaldo |
| 6,408,461 B2 * | 6/2002 | Zheng ........................... 5/417 |
| 6,751,816 B1 * | 6/2004 | Wechsler ....................... 5/417 |

* cited by examiner

Primary Examiner—Heather Shackelford
Assistant Examiner—Fredrick Conley
(74) Attorney, Agent, or Firm—Kelly Lowry & Kelley, LLP

(57) ABSTRACT

A multi-purpose mat has open and folded configurations. The mat includes a base and a plurality of sidewalls disposed about a periphery of the base. A first resilient flexible slat is disposed within one of the sidewalls and a second resilient flexible slat is disposed within the remaining sidewalls. The slats provide means for reinforcing the sidewalls and also provide a spring-like effect that allows the mat to automatically rollout into the open configuration from the folded configuration. The sidewalls fold about the periphery of the base; the sidewalls moving from a position generally adjacent to the base to a position generally perpendicular to and extending generally upwardly from the base when the mat is moved from the folded configuration to the open configuration.

18 Claims, 3 Drawing Sheets

MULTI-PURPOSE MAT

RELATED APPLICATION

Priority is claimed to U.S. Provisional Patent Application Ser. No. 60/422,968, filed Nov. 1, 2002.

BACKGROUND OF THE INVENTION

The present invention generally relates to mats, and more particularly relates to multi-purpose mats collapsible for storage.

Individuals are tired of getting their sweaty feet, vehicle interior and expensive athletic apparel dirty. There is nothing worse than having nowhere comfortable to get changed into dry socks and street clothes after a work and/or sports activity which has left the individual hot, sweaty and dirty. If the individual is at a location which there are no available facilities for changing clothes, the individual may be forced to change footwear in or by their vehicle. In this situation, the individual may be forced to put their wet and/or sweaty feet, not to mention their sports or work gear, on the dirt and/or otherwise contaminated surface where the individual is changing.

Many different types of mats have been employed to assist a user. For example, U.S. Pat. No. 4,709,430 discloses a weighted beach blanket. However, the blanket merely provides a surface for the user to lay on at the beach or on soft ground as the blanket must be anchored; lacking the versatility to be used on other surfaces where a user may desire to change their footwear or the like. In another example, U.S. Pat. No. 4,860,777 discloses a combination beach blanket and wind protector device. However, this blanket must also be anchored into a relatively soft surface in order to be used.

While blankets such as those described above may provide means of providing a place for a user to rest or change footwear, such blankets can always be improved.

Accordingly, there is a need for a mat that helps the user change footwear in various locations, regardless of the hardness or softness of the ground. There is also a need for a mat that is portable and easy to set up. There is a further need for a mat that does not need to be anchored in order to be effective. There is an additional need for a mat to assist a user change between their work clothes, sports clothes and any other outfit anywhere the user has to change footwear while preserving the cleanliness of the bottom of their feet. The present invention satisfies these needs and provides other related advantages.

SUMMARY OF THE INVENTION

The multi-purpose is an automatic mat that has a removable towel in the bottom. When the mat is opened up from a folded, closed configuration, the mat automatically rolls out. When the mat is ready to be put away, the mat is rolled back up, folded in half and side buckled shut. When the mat opens up, the sides pop up.

The mat is designed to assist a user change between their work clothes, sports clothes and any other outfit anywhere the user has to change footwear while preserving the cleanliness of the bottom of their feet. The mat provides a clean spot for a user to change their shoes. The mat assists the user in a ski resort parking lot when the user changes from changing from their snowboarding and/or skiing boots to street clothes and shoes. The mat is also helpful at a motocross track parking lot when the user is changing out of sweaty race gear to street clothes.

When the user has just completed beach and ocean related activities, this mat allows the user to climb out of their wet suit and back into work clothes at their parked car located in a parking lot or by the side of a highway adjacent to a stretch of ocean side beach.

The mat is also helpful when the user is leaving a muddy job site or getting back into their vehicle leaving a local rodeo or equestrian center.

In accordance with an embodiment of the present invention, a multi-purpose mat having open and folded configurations includes a base and a plurality of sidewalls disposed about a periphery of the base. The mat further includes a first resilient flexible slat disposed within one of the sidewalls and a second resilient flexible slat disposed within the remaining sidewalls. The slats provide means for reinforcing the sidewalls and also provide a spring-like effect that allows the mat to automatically rollout into the open configuration from the folded configuration.

The sidewalls fold about the periphery of the base such that the sidewalls move from a position generally adjacent to the base to a position generally perpendicular to and extending generally upwardly from the base when the mat is moved from the folded configuration to the open configuration.

The mat also includes an inwardly extending rim positioned along an upper portion of the sidewalls.

The base includes a plurality of layers and at least one of the layers is water impermeable. The base additionally includes a bottom non-slip surface.

The mat has a means for holding the mat in the folded configuration. This means for holding the mat in the folded configuration includes fasteners for securing the mat in the closed position. The fasteners include, without limitation, a buckle, hook and loop fasteners or the like.

A layer of material may be removably connected to a top surface of the base. This layer of material is in the form of a towel connected to the base. The base and towel include mating fasteners.

At least one pocket may be removably connected to at least one of the sidewalls. The at least one sidewall and at least one pocket include mating fasteners.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

A multi-purpose mat assists a user in changing footwear in various locations, regardless of the hardness or softness of the ground. The mat is also portable, easy to set up, and does not need to be anchored in order to be effective. The mat to assists a user in changing between their work clothes, sports clothes and any other outfit anywhere the user has to change footwear while preserving the cleanliness of the bottom of their feet. The mat may be kept in the trunk of a motor vehicle for a user, at some point, to change on, sit on, stand on, eat on, spread camera gear on or the like.

Figure 1:
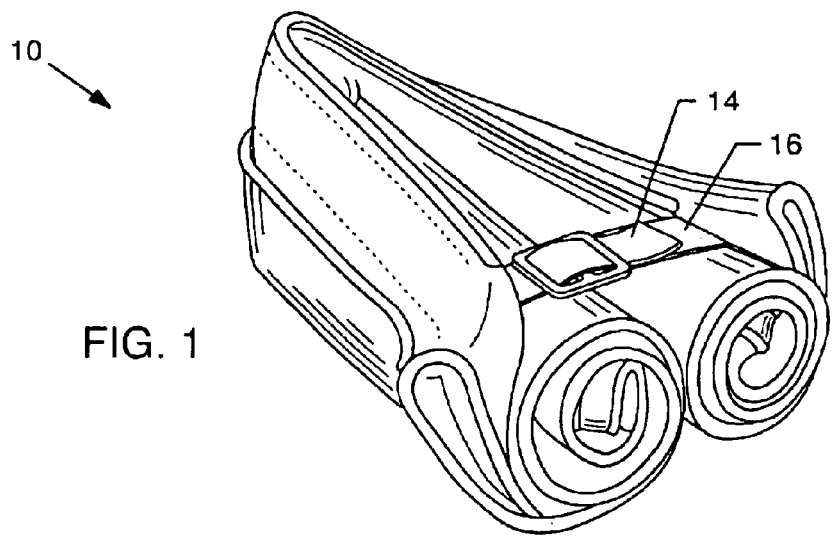
FIG. 1 illustrates an orthogonal view of a mat of the present invention in a closed position.
Figure 2:
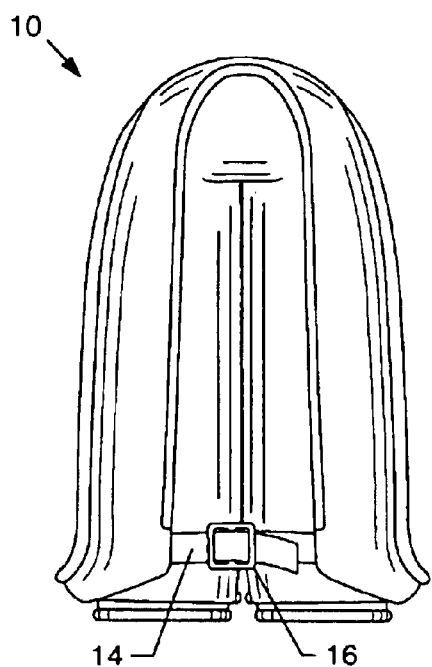
FIG. 2 illustrates a top plan view of the mat of FIG. 1.
Figure 3:
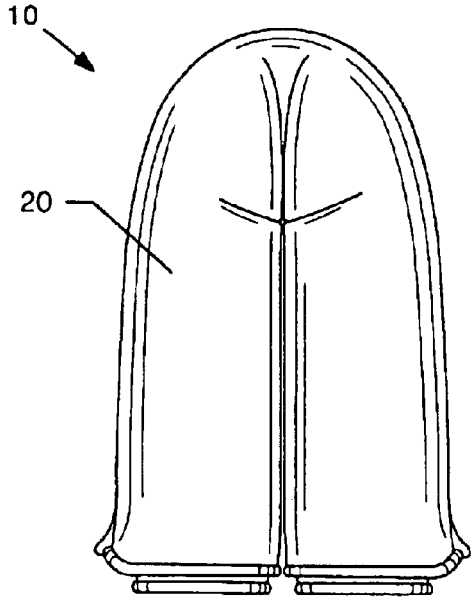
FIG. 3 illustrates a bottom plan view of the mat of FIG. 1.
Figure 4:
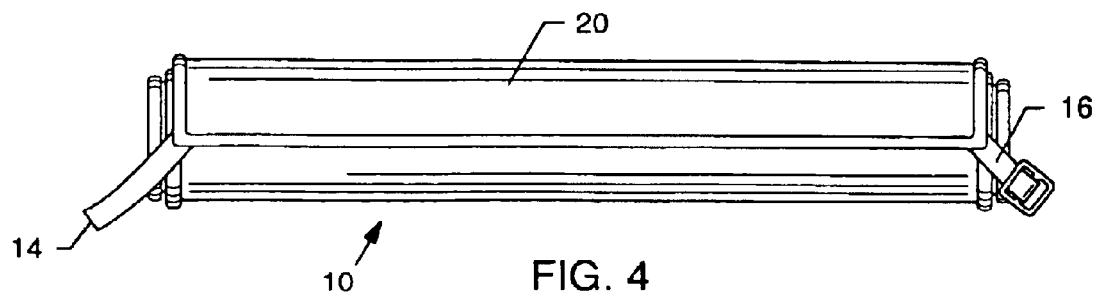
FIG. 4 illustrates a top plan view of the mat of FIG. 1 after the mat has been unbuckled and opened from its closed position but still rolled up.
Figure 5:
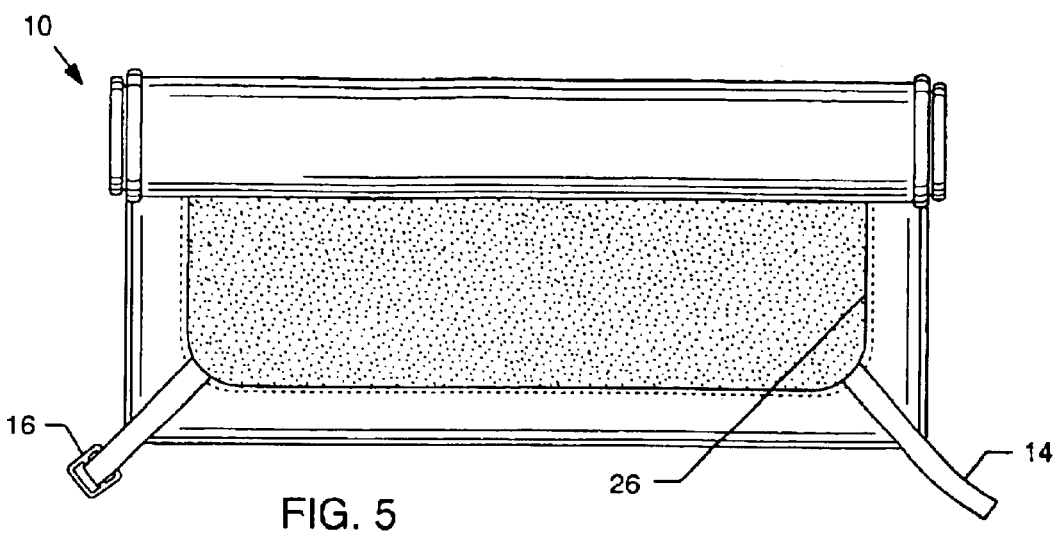
FIG. 5 illustrates a top plan view of the mat of FIG. 1 after the mat has been partially unrolled.
Figure 6:
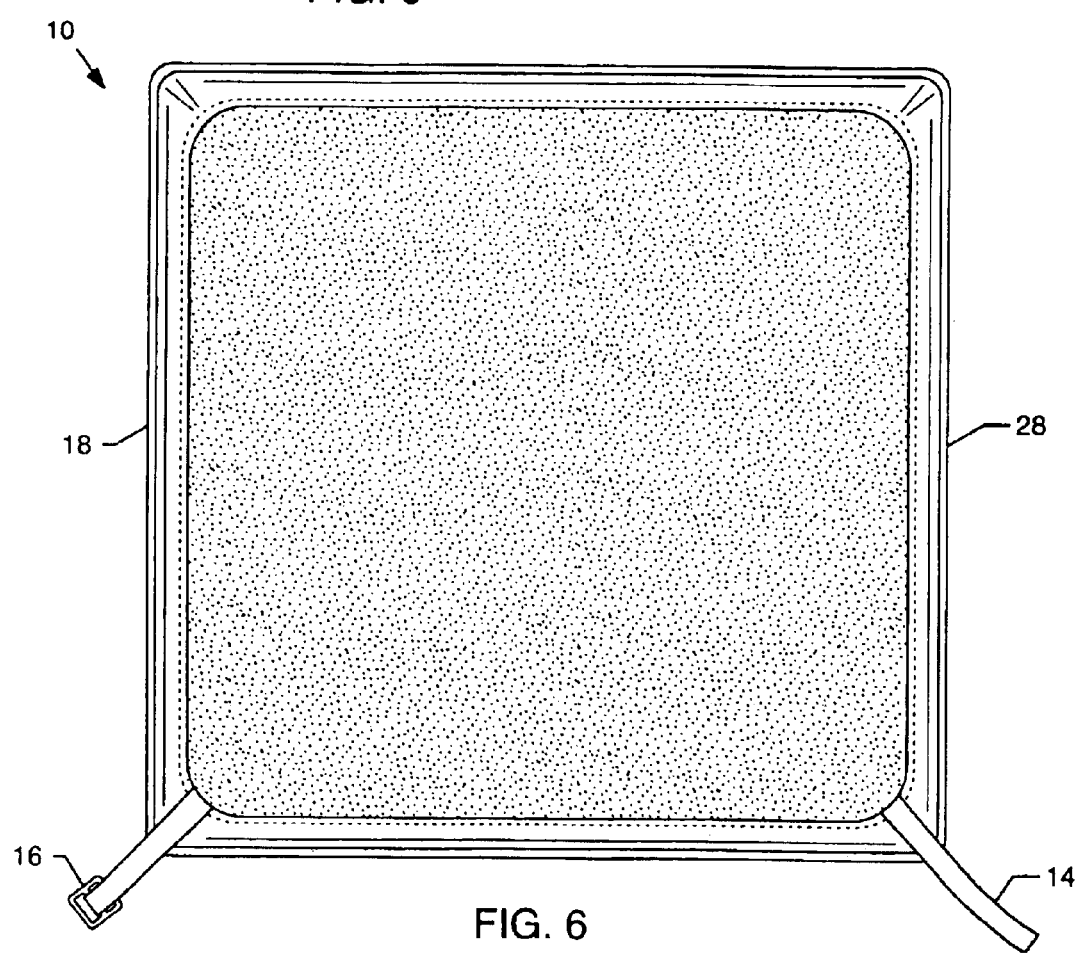
FIG. 6 illustrates a top plan view of the mat of FIG. 1 after the mat has been completely unrolled.
Figure 7:
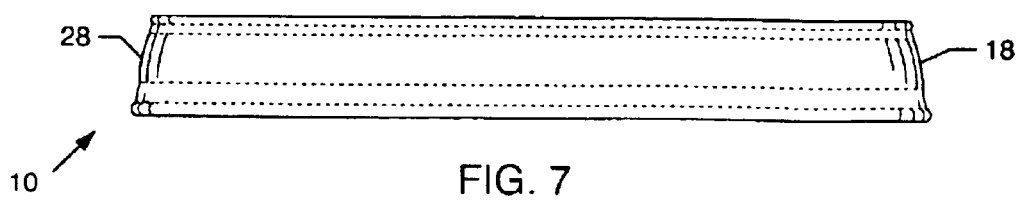
FIG. 7 illustrates a side elevational view of the mat of FIG. 6.

As illustrated in FIGS. 1–10, the present invention resides in an automatic mat 10 that has a removable layer of material 12 that may be made of various materials including, without limitation, a cloth towel, lamb's wool cloth, sheepskin chamois, leather, plastic, rubber sheet or the like. When unfolded, the mat 10 is generally rectangular in shape. The mat 10 further includes a strap 14 on one side of the mat 10 and a buckle 16 on another side of the mat 10 such that the securing strap 14 and buckle strap 16 secure the mat 10 in a closed position, as illustrated in FIG. 1. Alternatively, an elastic strap (not shown) may be placed around each end of the rolled up mat 10 to keep the mat 10 rolled. In an additional alternative, at least two elastic straps may be connected to the mat 10 such that, when the mat 10 is rolled up, each end of the rolled up mat 10 may have an associated one of the elastic straps wrapped around it to keep the mat 10 rolled.

When the mat 10 is opened up, the mat 10 automatically rolls out. When the mat 10 is ready to be put away, the mat 10 is rolled back up, folded in half and side buckled shut. The exteriors of the securing strap 14 and buckle strap 16 may be covered with hook and loop fasteners (e.g., VELCRO) to provide additional support for securing the mat 10 in a closed position. In the alternative, the strap and buckle may be in the form of a single piece that can be wrapped around the rolled and folded mat 10. Alternatively, various surfaces of the mat 10 can be covered with hook and loop fasteners so that when the mat is rolled up, the hook and loop fasteners on the surfaces can be pressed against each other to hold the mat 10 in a closed configuration. In yet another alternative, a strap covered with hook and loop fasteners can be wrapped around the rolled up mat 10 and held in place by hook and loop fasteners on a surface of the mat 10.

The mat 10 includes a washable exterior shell 18 which has a waterproof footprint bottom side 20. The bottom side 20 is covered with a non-slip material that allows the mat 10 to be non-slip when the bottom side 20 of the mat 10 comes in contact with the ground or other surface upon which the mat 10 rests. The shell 18 may be made of any durable synthetic or natural material. For example, the shell may be made of layers of waterproof canvas with a layer of foam between the layers and/or the shell may be made of neoprene or other materials used in the manufacture of wetsuits. The interior of the base or bottom portion 22 of the shell 20 includes several layers of material, identical or similar to the ones mentioned above, one of which is a cushion layer 24 of a foam-like material, such as rubber foam, to provide a cushion against rocks or other debris situated between the ground and the mat 10. This layer 24 may also act as a water impermeable moisture barrier.

The shell 18 includes a rim or lip 26 that goes around the perimeter of the shell 18 to keep a user's gear within the mat 10 and dirt, water, mud, snow, contaminants and/or any other undesirable element out of the mat 10.

Figures 9, 10:
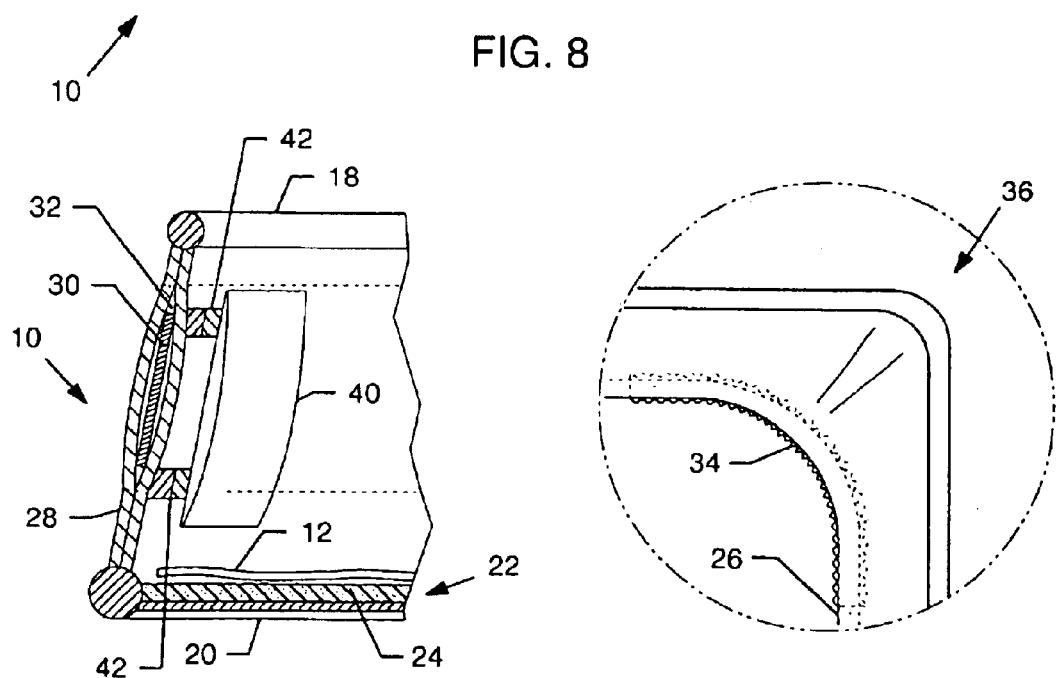
FIG. 9 illustrates a side elevational view of the mat of FIG. 8 taken along line 9—9.
FIG. 10 illustrates a partially fragmented top plan view of a corner of the mat of FIG. 8 taken along line 10—10.

The shell 18 has four perimeter sidewalls or sides 28 with thin flexible, resilient slat inserts 30 placed within insert pockets 32 within the sides 28 so that the slats 30 are disposed within the sides 28. As illustrated in FIG. 10, an elastic reinforcing band 34 may be placed around each corner 36 of the mat 10 to provide reinforcement for the sides 28 of the mat 10.

The slats 30 may be slightly curved. Two slats 30 may be used such that one piece is positioned within the back side of the mat 10 and then one long piece is inserted within the remaining front and two sides of the mat 10. The length of each slat 30 approximates the length of the side(s) of the mat 10 the slat 30 is inserted in. In the alternative, a continuous single slat 30 or four separate slats 30 may be inserted within the sides 28 of the mat 10. The slats 30 provide a spring-like effect that allows the mat 10 to automatically rollout and eases the ability of the mat 10 to be rolled back up into a closed storage position. The slats 30 may be made of a suitable metallic material (e.g., steel), heavy fabric, fiberglass, plastic or any suitable elastomeric material.

The insert pockets 32 may be sewn on the outer surface of the sidewalls 28 for the slats 30 to be inserted so that they are disposed within the sidewalls 28. Folds of material (not shown) located on the exterior and interior of each corner 36 of the mat 10 cover the openings (not shown) of the insert pocket 26 through which the slats 30 are inserted into the insert pockets 26. On the front and back sides of the mat 10, the insert pockets 32 may be sewn on the inside surface of the sides 28. The resiliency and flexibility of the slats 30 help achieve the spring-like rolling out effect when the mat 10 is moved from a folded, closed configuration to an open configuration.

Figure 8:
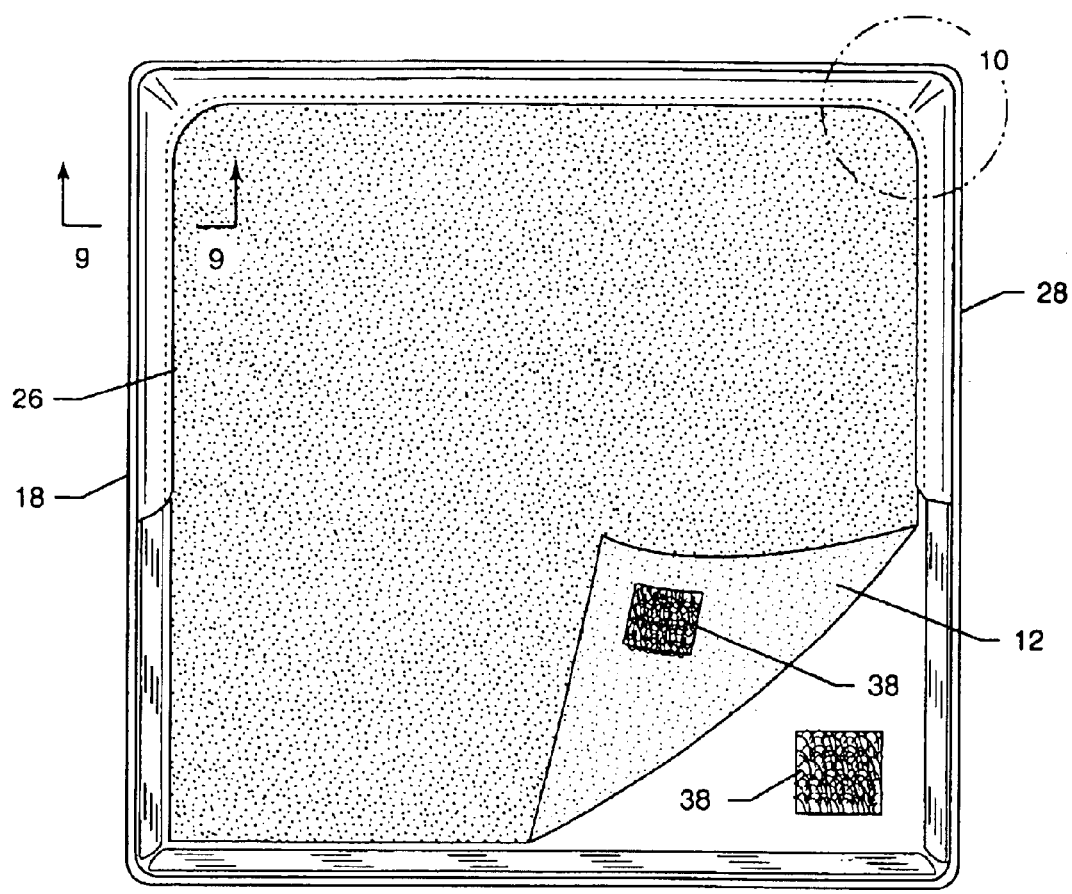
FIG. 8 illustrates a top plan view of the mat of FIG. 1 where a section of the towel overlying the undermat has been lifted to illustrate the underside of the towel and upper surface of the undermat.

The layer of material 12 (e.g., a towel) is removably attached to the top surface of the bottom portion 22 of the mat 10. The towel 12 may be attached to the mat using a variety of attachment means 38, including metallic snaps, plastic snaps and/or hook and loop material (e.g., VELCRO). For example, as illustrated in FIG. 8, a patch of VELCRO 38 may be placed near each corner 36 of the interior of the mat 10. A mating patch of VELCRO may be placed near each corner of the towel 12 on the bottom surface of the towel 12 so that the towel 12 may be attached to the interior of the mat 10. The towel 12 is removable for washing. The towel 12 can include indicia, such as a person's name, the logo of a sponsor, and/or a company's name. Similar indicia may also be placed on the shell 20. As outlined above, the towel 12 may be made of any synthetic or natural material. In the alternative, an additional towel may also be included that can lay on top of the towel 12 removably attached to the mat 10.

At least one sleeve with several pockets 40 is removably connected to at least one side 28 on the interior of the shell 18. The sleeve 40 may include a single pocket or any number of pockets which may vary in shape and size. The sleeve 40 is connected to the side 28 using a variety of attachment means 42, including metallic snaps, plastic snaps and/or hook and loop material (e.g., VELCRO). The sleeve 40 may be open or closeable by a fastener such as a zipper running along its length, a flap that covers the covers the opening of the sleeve 40 and held shut by hook and loop fasteners, etc.

In use, in order to roll up the mat 10 from an open configuration to a closed configuration, the user applies pressure on two opposite sides 28 and presses those sides 28 down towards the center of the mat 10 and towards the bottom portion 22 of the shell 18 so that the sides 28 are generally parallel to and/or adjacent to the bottom portion 22. In order to roll the mat 10 flat, the corners 36 on the ends of those sides 28 are also pressed down towards the interior of the mat 10. This lays the sides 28 flat, (e.g., these two sides being the top and bottom of the long insert slat 30, the center of this being the front side spine). As each side 28 connected is connected to at least two adjacent sides 28, the sides 28 being directly folded by the user pull the remaining sides 28 downwards as well. Each of the sides 28 fold about the periphery of the bottom portion 22 of the shell 18. Once the user folds these sides 28 over, the user then rolls the mat 10 closed from either the front side 28 towards the back side 28 or the back side 28 towards the front side 28. Whichever way the mat 10 is rolled closed, once the mat 10 is rolled up, the mat 10 is then folded in half and buckled shut. All that remains is for the user to wipe off the exterior of the mat 10 and place the mat 10 within a carry bag (not shown). The carry bag may be waterproof and sized large enough to accommodate both snowboarding boots and wetsuits as well as other sports gear. The carry bag may also include outside pockets for holding keys, wallets, etc. In this manner, a user can keep the interior of their vehicle clean and dry. In the alternative, the mat 10 may be merely rolled up like a bedroll for storage. In yet another alternative, the mat 10 may be folded into quarters and held shut using the straps 14 and buckle 16.

whereby the slats provide a spring-like effect that allows the mat to automatically rollout into the open configuration from the folded configuration;

When a user desires to move the mat 10 from its folded closed configuration to an open configuration, the user opens the straps 14, 16 holding the mat 10 closed and unrolls the mat 10. The resiliency of the shell 18 and slats 30 help achieve the spring-like rolling out effect helping the mat 10 to automatically roll out to an open configuration once the straps 14, 16 are released. As the mat 10 rolls out, the sides 28 move from a position generally adjacent to the bottom portion 22 to a position generally perpendicular to and extending generally upwardly from the bottom portion 22.

The mat 10 can be used for a variety of activities including, without limitation, baseball, beach going, boating, fishing, football, golf, hiking, kiyaking, marine boating activities, mountaineering, motocross, mountain biking, outdoor photography, prayer (i.e., as a prayer mat), cycling, roller hockey, rock climbing, running, scuba diving, motor home and recreational vehicle uses, skiing, snowboarding, soccer, surfing, duatholons, triatholons, decatholons or any sport or activity.

The mat 10 can also be used for non-sport activities, such as diaper changing, changing clothes, a play area for kids, a place to eat food or the like.

The mat 10 can also be used as a portable pet mat that can be placed on a car seat so that the family pet does not get the seats dirty. The mat 10 can likewise be placed on a bed, sofa, or rug for similar reasons.

In an alternative embodiment, a plurality of generally L-shaped resilient flexible brackets (not shown) can be spaced around the periphery of the base 22 on the interior of the shell 18. The L-shaped brackets are connected to the bottom portion 22 and sides 28 such that when the sides 28 are pushed downwards towards the bottom portion 22, the resiliency and flexibility of the brackets bias the sides 28 upwards so that the sides 28 are generally perpendicular to the bottom portion 22.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A multi-purpose mat having open and folded configurations, comprising:
    a base;
    a plurality of sidewalls disposed about a periphery of the base;
    an inwardly extending rim positioned along an upper side portion of the sidewalls; and
    a first resilient flexible slat disposed within one of the sidewalls and a second resilient flexible slat disposed within the remaining sidewalls, wherein the slats provide means for reinforcing the sidewalls, and whereby the slats provide a spring-like effect that allows the mat to automatically rollout into the open configuration from the folded configuration;
    wherein the sidewalls fold about the periphery of the base, whereby the sidewalls move from a position generally adjacent to the base to a position generally perpendicular to and extending generally upwardly from the base when the mat is moved from the folded configuration to the open configuration.

2. The mat of claim 1, wherein the base includes a plurality of layers, wherein at least one of the layers is water impermeable.

3. The mat of claim 2, wherein the base includes a bottom non-slip surface.

4. The mat of claim 1, including means for holding the mat in the folded configuration.

5. The mat of claim 4, wherein the means for holding the mat in the folded configuration includes fasteners for securing the mat in the closed position.

6. The mat of claim 5, wherein the fasteners include a buckle.

7. The mat of claim 5, wherein the fasteners include hook and loop fasteners.

8. The mat of claim 1, including a layer of material removably connected to atop surface of the base.

9. The mat of claim 8, wherein the layer of material is a towel connected to the base, wherein the base and towel include mating fasteners.

10. The mat of claim 1, including at least one pocket removably connected to at least one sidewall, wherein the at least one sidewall and at least one pocket include mating fasteners.

11. A multi-purpose mat having open and folded configurations, comprising:
    a base;
    a plurality of sidewalls disposed about a periphery of the base;
    an inwardly extending rim positioned along an upper portion of the sidewalls;
    means for holding the mat in the folded configuration including fasteners for securing the mat in the closed position; and
    a first resilient flexible slat disposed within one of the sidewalls and a second resilient flexible slat disposed within the remaining sidewalls, wherein the slats provide means for reinforcing the sidewalls, and whereby the slats provide a spring-like effect that allows the mat to automatically rollout into the open configuration from the folded configuration;

wherein the sidewalls fold about the periphery of the base, whereby the sidewalls move from a position generally adjacent to the base to a position generally perpendicular to and extending generally upwardly from the base when the mat is moved from the folded configuration to the open configuration.

12. The mat of claim 11, wherein the base includes a plurality of layers, wherein at least one of the layers is water impermeable, and a bottom non-slip surface.

13. The mat of claim 11, wherein the fasteners include a buckle.

14. The mat of claim 11, wherein the fasteners include hook and loop fasteners.

15. The mat of claim 11, including a towel removably connected to a top surface of the base, the base and towel including mating fasteners.

16. The mat of claim 11, including at least one pocket removably connected to at least one sidewall, wherein the at least one sidewall and at least one pocket include mating fasteners.

17. A multi-purpose mat having open and folded configurations, comprising:
- a base including a plurality of layers, wherein at least one of the layers is water impermeable, and a bottom non-slip surface;
- a plurality of sidewalls disposed about a periphery of the base;
- an inwardly extending rim positioned along an upper portion of the sidewalls;
- means for holding the mat in the folded configuration including fasteners for securing the mat in the closed position;
- a towel removably connected to a top surface of the base, the base and towel including mating fasteners;
- at least one pocket removably connected to at least one sidewall, wherein the at least one sidewall and at least one pocket include mating fasteners; and
- a first resilient flexible slat disposed within one of the sidewalls and a second resilient flexible slat disposed within the remaining sidewalls, wherein the slats provide means for reinforcing the sidewalls, and whereby the slats provide a spring-like effect that allows the mat to automatically rollout into the open configuration from the folded configuration;

wherein the sidewalls fold about the periphery of the base, whereby the sidewalls move from a position generally adjacent to the base to a position generally perpendicular to and extending generally upwardly from the base when the mat is moved from the folded configuration to the open configuration.

18. A multi-purpose mat having open and folded configurations, comprising:
- a base;
- a plurality of sidewalls;
- at least one pocket removably connected to at least one sidewall, wherein the at least one sidewall and at least one pocket include mating fasteners; and
- a first resilient flexible slat disposed within one of the sidewalls and a second resilient flexible slat disposed within the remaining sidewalls, wherein the slats provide means for reinforcing the sidewalls, and whereby the slats provide a spring-like effect that allows the mat to automatically rollout into the open configuration from the folded configuration;

wherein the sidewalls fold about the periphery of the base, whereby the sidewalls move from a position generally adjacent to the base to a position generally perpendicular to and extending generally upwardly from the base when the mat is moved from the folded configuration to the open configuration.

* * * * *